E. L. MARSHALL.
SEPARATING APPARATUS.
APPLICATION FILED AUG. 11, 1919.
1,356,384.
Patented Oct. 19, 1920.
2 SHEETS—SHEET 1.
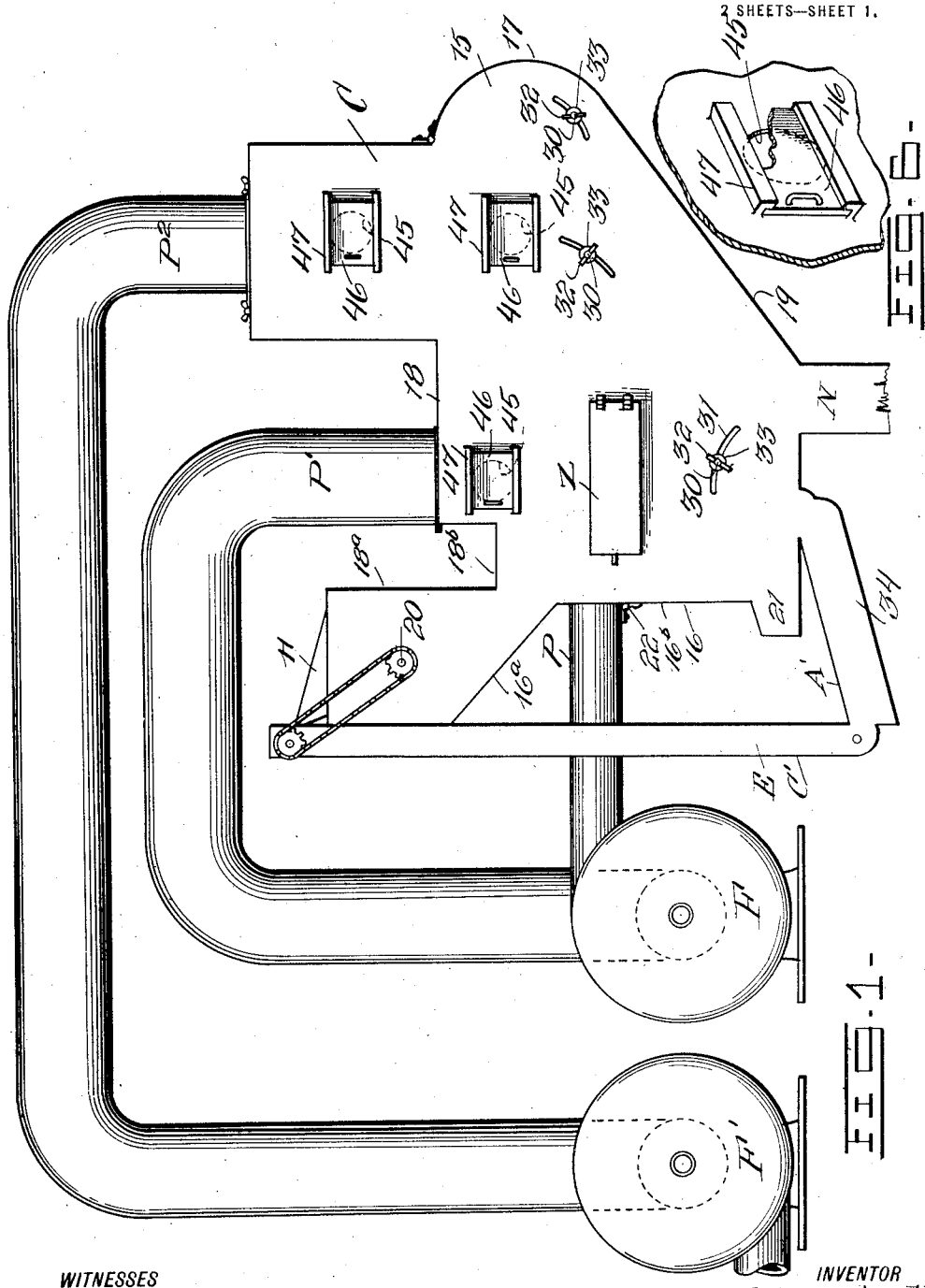
WITNESSES
INVENTOR
E. L. Marshall
BY
ATTORNEYS

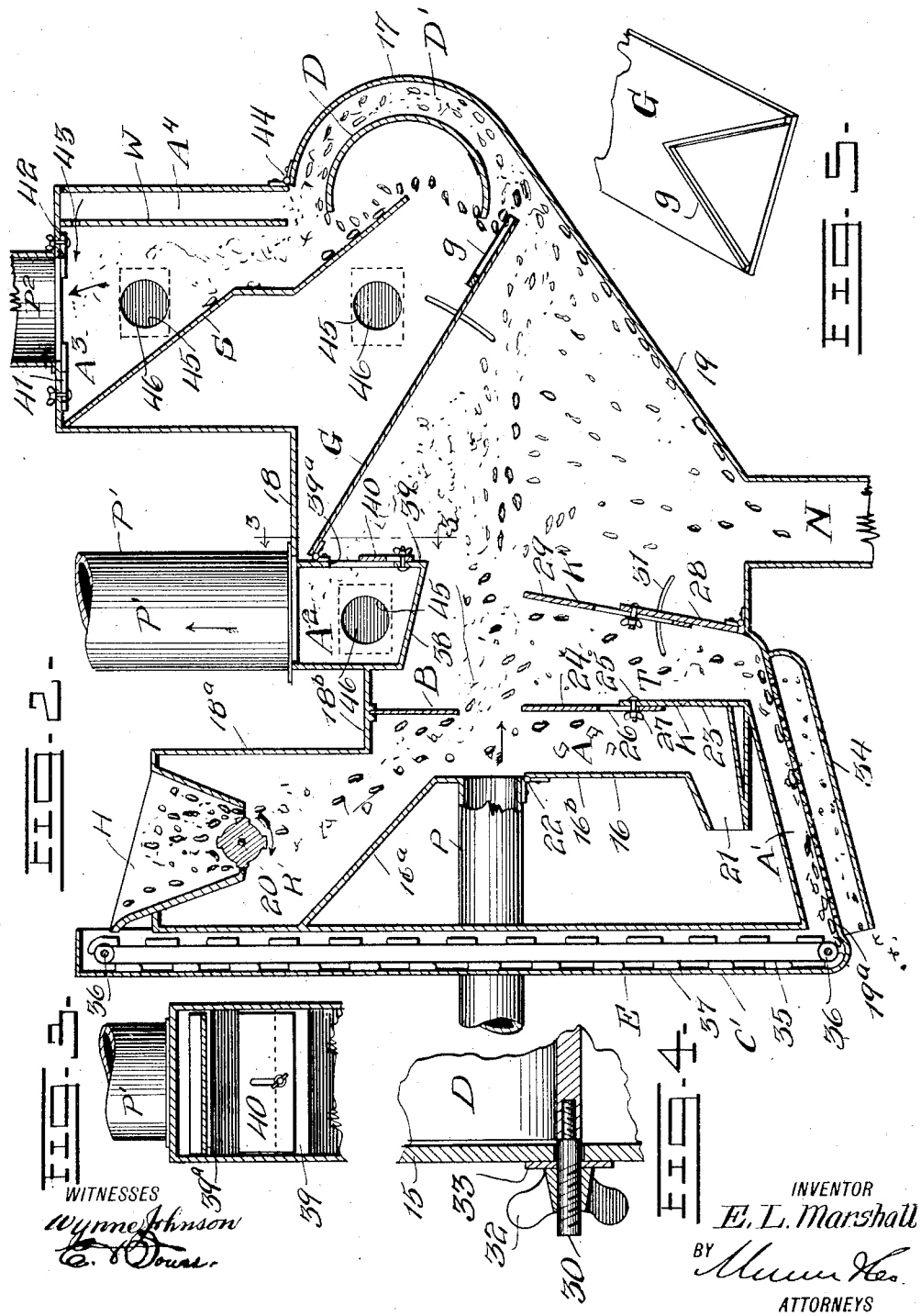

UNITED STATES PATENT OFFICE.

EDWARD LEE MARSHALL, OF SUFFOLK, VIRGINIA.

SEPARATING APPARATUS.

1,356,384.   Specification of Letters Patent.   Patented Oct. 19, 1920.

Application filed August 11, 1919. Serial No. 316,711.

*To all whom it may concern:*

Be it known that I, EDWARD LEE MARSHALL, a citizen of the United States, and a resident of Suffolk, in the county of Nansemond and State of Virginia, have invented certain new and useful Improvements in Separating Apparatus, of which the following is a specification.

My invention relates generally to apparatus for separating small substances of approximately one weight from other small substances of approximately another weight, and particularly to an apparatus for separating peanuts from the gravel and stems which are usually found with the peanuts.

It is the purpose of my invention to provide an apparatus of the character specified, which is capable of completely and thoroughly separating the foreign substances from the peanuts, such separation being effected in the main by air blasts which are controlled to coöperate with the natural force of gravity.

I will describe one form of separating apparatus embodying my invention, and will then point out the novel features thereof in claims.

In the accompanying drawings:

Figure 1 is a view showing in side elevation one form of separating apparatus embodying my invention, Fig. 2 is a fragmentary vertical sectional view of the apparatus shown in Fig. 1, Fig. 3 is a fragmentary sectional view taken on the line 3—3 of Fig. 2, Figs. 4, 5, and 6 are detail views of certain parts of the apparatus shown in the preceding views.

Similar reference characters refer to similar parts in each of the several views.

Referring specifically to the drawings, C designates the casing formed of any suitable material and comprising side walls 15, end walls 16 and 17, and top and bottom walls 18 and 19, respectively. As shown in Fig. 2, H designates a hopper which is tapered in the direction of its outlet and is provided with a ribbed roller R mounted on an axle 20.

It will be noted that the arrangement of the roller R is such that the substances within the hopper are fed downwardly only at one side of the roller. $16^a$ designates an inclined wall which coöperates with walls $18^a$ and $18^b$ to provide a restricted passageway for directing the substances or material against a baffle plate B.

As shown, the baffle plate B depends from the wall $18^b$ and is spaced from the adjacent end wall 16. At a point below the baffle plate B and adjacent to the inclined wall $16^a$, I provide an opening, to the walls of which is connected a pipe P, which communicates with a fan F (Fig. 1) and serves to direct the blast of air inwardly within the casing C.

Arranged in vertical alinement with the baffle plate B is a partition K which coöperates with the adjacent section $16^b$ of the wall 16 to provide a gravel depositing chamber A. The lower end walls of the chamber A provide a spout 21 for discharging the gravel exteriorly of the apparatus. As shown in Fig. 2, the wall $16^b$ is hinged at 22, so as to permit the same to be swung upwardly and to thereby gain access to the chamber A for cleaning purposes.

The partition K comprises a stationary section 23 and a movable section 24 extensibly associated with the stationary section by means of a bolt 25 carried by the section 23 working within a slot 26 formed in the section 24, a nut 27 threadedly engaging the bolt 25 to effect a locking of the section 24 in any adjusted position.

K′ designates a partition similar to the partition K which coöperates with the latter to form a throat T for receiving and directing material to be separated into a chamber A′. The partition K′ comprises a hinged section 28 and an extensible section 29 associated with the hinged section in a manner identical to the sections 23 and 24 of the partition K. Lateral adjustment of the partition K′ is effected through the medium of a bolt 30 secured to one end of the partition and extending from an arcuate slot 31 formed in the adjacent side wall 15. A wing nut 32 is threadedly mounted upon the bolt 30 and bears upon a washer 33 for locking the partition in any adjusted position. The construction of the parts just described are clearly shown in Fig. 4 of the drawings.

The chamber A′ is of a restricted area and includes a lower perforated wall $19^a$ below which is arranged a pan 34. The wall $19^a$ and the pan 34 are arranged on an incline so that the material falling thereon will descend by means of gravity to the lower ends of the same. As shown in Fig. 2, the upper end of the pan 34 is closed, and its lower end is open so as to discharge the material exteriorly of the apparatus. The lower end of the chamber A' communicates with a vertically disposed casing C', and the upper end of the latter is disposed adjacent the inlet end of the hopper 8 as clearly shown in Fig. 2. Within the chamber C' is mounted a conveyer or elevator E for lifting the material which is deposited in the lower end of the chamber A' upwardly and into the hopper 8. In the present instance, the elevator E comprises an endless belt 35 trained around pulleys 36 which are rotatably mounted within the casing in any suitable manner.

Secured to the belt at regular spaced intervals, are buckets 37 which are adapted to lift the particles of material within the casing as the belt is rotated. It will be particularly noted that the disposition of the pulleys 36 is such that the left hand stretch of the belt 35 is at all times disposed in closer proximity to the adjacent side wall of the casing than is the right hand stretch with respect to its adjacent side wall. The purpose of this arrangement is that the buckets 37 when traveling upward, will contact with the adjacent wall of the casing C, and thereby form chambers or pockets in which the particles of material are incased as they travel upward.

Located directly beneath the top wall 18 of the casing C and in advance of the baffle plate B is a suction chamber designated generally at $A^2$. This chamber is formed by an inclined wall 38, and a vertical wall 39, both of which are connected to or formed integrally with the upper wall 18 of the casing. As shown in Fig. 3, the vertical wall 39 is provided with an opening $39^a$ which is controlled by a shutter 40 adjustably associated with the wall 39 in a manner identical to the sections 23 and 24 of the partition K. The upper side of the chamber $A^2$ is formed with an opening, which communicates with one end of a pipe P', the opposite end of the latter being connected to the fan F as shown in Fig. 1, in such manner that a suction is created in the pipe in the direction of the arrow (Fig. 2).

Hingedly secured to the wall 39 of the chamber $A^2$ is a throat plate G which is at all times inclined downwardly and has its lower edge terminating adjacent to the lower inclined wall 19 of the casing. As shown in Fig. 5, the upper side of the plate G is provided with a V-shaped rib $g$, the ends of which terminate at the lower corners of the plate as shown. The plate G is vertically adjustable within certain limits by means of a structure similar to that shown in Fig. 4, and previously described.

In advance of the plate G is a semi-circular diaphragm or partition D which is mounted for circumferential movement by a structure such as shown in Fig. 4, and previously described. The adjacent portion of the end wall 17 of the casing is also curved in the form of an arc so that it co-acts with the diaphragm to provide a restricted passageway D' for directing the material in a predetermined course, as will be better understood from a consideration of the operation of the apparatus. Arranged between and above the plate G of the diaphragm D is a throat sheet S. The throat sheet S coöperates with a rigid partition W to provide a final separating chamber $A^3$. The upper wall of the chamber $A^3$ communicates with a pipe $P^2$, the latter in turn communicating with a suction fan F', whereby the suction is at all times maintained in the chamber $A^3$ in the direction of the arrow (Fig. 2).

The intensity of the suction is varied by means of shutter plates 41 and 42, the adjustment of these plates being secured by the usual bolt and slot connection. As shown in Fig. 2, the partition W is arranged parallel to the adjacent end wall 17 and is provided adjacent its upper edge with perforations 43, the object of which is to create a suction upwardly between these walls to hold certain of the material in suspension as will be hereinafter described. The walls W and 17 co-act to provide a chamber designated at $A^4$, it being noted that that portion of the wall 17 is hingedly mounted as at 44 so as to allow ready access to the adjacent parts of the apparatus.

As shown in Figs. 1, 2 and 6, the side walls of the chambers $A^2$ and $A^3$ as well as that side wall between the plate G and the sheet S, are provided with circular openings 45, for the purpose of gaining access to the interior of the casing to inspect, clean, or repair the different elements contained therein. These openings are controlled by doors 46 slidably mounted within guideways 47, as clearly shown in Fig. 6. The door 46 of the chamber $A^2$ may be employed to vary the size of the opening 45 thus providing an additional controlling means for the suction created within this chamber. As shown in Fig. 2, I also provide the side wall 15 of the casing with a hingedly mounted door Z which controls an opening disposed adjacent the partitions K and K'.

From the foregoing description taken in conjunction with the accompaning drawings, the operation of the apparatus will be readily understood as follows:

The materials to be separated, which in the present instance, comprises peanuts and foreign substances generally comprising the stems and gravel, are all introduced into the hopper H. With the roller R rotating in a clockwise direction as viewed in Fig. 2, the material is uniformly fed from the forward side of the roller, as previously described. The material after leaving the hopper H descends by gravity into engagement with the baffle plate B and there it is directed into the path of a blast of air emanating from the pipe P. To prevent crushing of the peanuts, when they impinge upon the baffle plate B, I preferably form the latter of any soft flexible material such as leather or the like. It will be noted that the lower edge of the baffle plate B is in horizontal alinement with the upper edge of the pipe P so that the blast of air leaving the pipe P does not displace the plate B, while the latter at the same time insures the deposition of the material into the path of the blast. The material upon reaching the blast in the pipe P is partly separated before passing beyond the plate B and the partition K, that is to say, the heavier particles of foreign material such as the large pieces of gravel are deposited within the chamber A and are ultimately disposed exteriorly of the apparatus through the spout 21. The remainder of the material is driven forwardly and when it reaches the point above the throat T the smaller particles of gravel and some of the peanuts are deposited within the throat T, whereupon they fall upon the wall 19$^a$. Because of the inclination of the wall 19$^a$, the peanuts gravitate to the lower end of the elevator E, while the smaller particles of gravel drop through the perforations and onto the pan 34 where they are deposited upon the ground. The peanuts and part of the foreign substances which have not been separated are carried upwardly by the elevator and deposited within the hopper H so that they are again subjected to the separating steps just described.

The material after passing across the upper end of the throat T travels in the general direction indicated in Fig. 2, and those parts of the foreign substances which are lighter than the peanuts are held in suspension by means of the suction created in the chamber A$^2$. This gives the peanuts an opportunity to gravitate and ultimately discharge through the spout N. Those peanuts which do not pass out of the spout N and the foreign substances which are carried forward with the blast of air from the pipe P, are blown upwardly through the restricted chamber D'. When the material reaches the intersection of the chambers A$^3$ and A$^4$, a suction created within the chamber A$^4$ holds the lighter foreign substances in suspension while the peanuts are blown and sucked upwardly into the chamber A$^3$. Because of the inclination of the throat sheet S, and the area of the opening formed in the top wall of the chamber A$^3$, the peanuts are not blown or sucked through the pipe P$^2$, but strike the upper wall of the chamber and are thereby deflected downwardly along the throat sheet S as indicated in Fig. 2 of the drawing.

The peanuts gravitate from the lower edge of the sheet S and as shown in the drawing, they ultimately strike the throat plate G, where they are directed to the side edges of the plate through the medium of the rib $g$. From the plate G, the peanuts pass again into the main chamber of the casing where they finally exit from the spout N.

From the foregoing operation, it will be manifest that by virtue of the numerous separating operations to which the material is subjected, the thorough separation of the foreign substances from the peanuts is effected. It will also be manifest that the apparatus is extremely simple and consequently capable of manufacture at a nominal cost.

Although I have herein shown and described only one form of separating apparatus embodying my invention, it is to be understood that various changes and modifications may be made herein without departing from the spirit of the invention and the spirit and scope of the appended claims.

I claim:—

1. A separating apparatus, comprising a casing, means for feeding material to the casing, means for creating an air blast in the casing, means for directing the material into the blast, means for receiving the heavier particles of the material and depositing the same exteriorly of the casing, an adjustable throat for collecting a part of the material to one side of the blast of air, means for separating the smaller particles as the material leaves the throat, an elevator for returning the larger particles to the feed means from the separating means, means for temporarily holding the lighter particles of the material in suspension in the casing and ultimately withdrawing the same therefrom, a second suspension means in advance of the first suspension means, a spout between said suspension means for allowing the desirable particles of the material to leave the casing, means for effecting a final separation of the material and withdrawing the undesirable particles from the casing, and means for directing the desirable material to said spout.

2. A separating apparatus, comprising a casing, a hopper for uniformly feeding the material to be separated into the casing, an air pipe, means for creating a blast of air through said pipe and into said casing, and a baffle plate within the casing and disposed to direct the material from said hopper into the path of the air blast from said pipe, said plate being formed of a flexible material.

3. A separating apparatus, comprising a casing, a pipe communicating with one end of the casing, means for creating a blast of air through said pipe and inwardly of said casing, means for feeding the material downwardly to said air blast, partitions arranged below the air blast for effecting the separation of a portion of the material, said partitions being adjustable vertically to vary the amount of the material to be separated, means for returning certain particles of the material separated by said partitions back to said feeding means, and suction means for holding in suspension the lighter particles of that material which have not been separated by said partitions and delivering the same exteriorly of the casing, and means for collecting the heavier particles of material from said air blast after they have passed said partitions.

4. A separating apparatus, comprising a casing, means for creating a blast of air horizontally through the casing, means for collecting the heavier particles of material which are not sustained in the air blast, means for subsequently holding the lighter particles of the material in suspension and then withdrawing the same from the casing, means for collecting the heavier particles of material which are retained in the air blast, while the lighter particles of material are held in suspension, and means for subsequently collecting the heavier particles of material which are not collected by the last mentioned means.

5. A separating apparatus comprising a casing, means for creating a blast of air horizontally through the casing, a diaphragm at one end of the casing for directing a blast of air upwardly, a separating chamber above said diaphragm, means for creating a draft upwardly through said chamber, a partition in the chamber for creating a suction at the intersection of the diaphragm and chamber, a throat sheet associated with the diaphragm, for collecting a portion of the material, and a throat plate associated with said sheet and diaphragm for directing the material collected in a predetermined path.

6. A separating apparatus comprising, a casing, means for creating a blast of air through the casing, a diaphragm at one end of the casing for directing the blast of air upwardly, a separating chamber above said diaphragm, means for creating a draft upwardly through said chamber, a partition in the chamber for creating a suction at the intersection of the diaphragm and chamber, a throat sheet associated with the diaphragm for collecting a portion of the material, and a throat plate adjustable with relation to said sheet and diaphragm for directing the material collected in a predetermined path.

7. A separating apparatus comprising, a casing, means for creating a blast of air through the casing, a diaphragm at one end of the casing for directing the blast of air upwardly, a separating chamber above said diaphragm, means for creating a draft upwardly through said chamber, a partition in the chamber for creating a suction at the intersection of the diaphragm and chamber, a throat sheet associated with the diaphragm for collecting a portion of the material, and a throat plate adjustable with relation to said sheet and diaphragm for directing the material collected in a predetermined path, said diaphragm being adjustable circumferentially for the purpose described.

8. A separating apparatus comprising, a casing, means for feeding material to the casing, means for creating an air blast in the casing, means adjacent the air blast means for collecting the heaviest particles of material, means adjacent the last mentioned means for collecting other particles of material, means for suspending and carrying away the lighter particles of the material, and means for separating undesirable particles of material remaining in suspension from the desirable particles and collecting each of the same, all of said means being adjustable to vary the amount of material collected.

9. A separating apparatus comprising, a casing, means for feeding a material to the casing, means for creating an air blast in the casing, means for creating a suction at the end of the casing, adjustable means interposed between said means for separating and collecting particles of the material, and a second suction means adjustable to suspend the lighter particles of material and carry the same exteriorly of the casing.

10. A separating apparatus comprising, a casing having an inclined wall merging into an arcuately curved wall, a discharge spout adjacent the lower end of the inclined wall, an inlet pipe in advance of the discharge spout and arranged horizontally of the casing for directing a blast of air horizontally through the casing, a hopper for discharging material in front of said pipe, a flexible partition and a rigid expansible partition arranged at opposite sides of said pipe, an outlet spout adjacent said partition, a second partition hingedly supported on the casing and comprising extensible sections, the second partition being spaced from the first partition to provide a throat, a chamber communicating with the throat, elevating means between said chamber and said hopper, a throat plate hingedly supported within the casing, a stationary throat sheet above said plate, a diaphragm associated with said curved wall, said throat sheet and said throat plate for directing the material in a predetermined path, and a second pipe for creating a suction adjacent the throat sheet.

11. A separating apparatus comprising, a casing having a discharge spout, and an inclined wall adjacent the discharge spout, a pipe communicating with the casing for introducing a blast of air horizontally through the casing, adjustable partitions within the casing arranged to provide separating chambers at a point in advance of said discharge spout, a second pipe for creating a suction above the blast of air entering through the first pipe, means for varying the intensity of the suction, a third pipe communicating with the casing for creating a suction therein, and adjustable means for effecting a final separation of the material under the action of the suction of the third pipe and for returning a portion of the material to the inclined wall where it is discharged through said discharge pipe.

12. A separating apparatus comprising, a casing, means for creating a blast of air horizontally through the casing, a discharge nozzle formed in the casing, a diaphragm at one end of the casing for directing the blast of air upwardly thereof, a separating chamber above said diaphragm, means for creating a draft upwardly through said chamber, an inclined throat sheet, an adjustable inclined throat plate, a V-shaped rib formed on said throat plate, and adjustable partitions in advance of said nozzle for the purpose described.

EDWARD LEE MARSHALL.